United States Patent
Staaden et al.

(10) Patent No.: US 7,734,438 B2
(45) Date of Patent: Jun. 8, 2010

(54) METHOD FOR DETERMINING CORRECTION VALUES FOR CORRECTING POSITIONAL MEASUREMENT ERRORS IN A MACHINE HAVING AT LEAST ONE TRANSLATIONAL AXIS OF MOVEMENT

(75) Inventors: Ulrich Staaden, Aalen (DE); Guenter Grupp, Boehmenkirch (DE); Eugen Aubele, Boehmenkirch (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 127 days.

(21) Appl. No.: 11/956,492

(22) Filed: Dec. 14, 2007

(65) Prior Publication Data

US 2008/0154527 A1 Jun. 26, 2008

Related U.S. Application Data

(63) Continuation of application No. PCT/EP2006/004641, filed on May 17, 2006.

(30) Foreign Application Priority Data

Jun. 16, 2005 (DE) .................. 10 2005 028 788

(51) Int. Cl.
*G01C 17/38* (2006.01)
(52) U.S. Cl. .................. 702/95; 318/632; 700/193
(58) Field of Classification Search .................. 702/95, 702/150, 151, 168; 33/559, 705; 250/559.29; 318/603, 632, 637; 700/193, 195
See application file for complete search history.

(56) References Cited

U.S. PATENT DOCUMENTS

| | | | |
|---|---|---|---|
| 3,555,254 A | 1/1971 | Gerber | |
| 4,160,328 A | 7/1979 | Ernst | |
| 4,945,501 A * | 7/1990 | Bell et al. | .................. 702/95 |
| 5,237,509 A | 8/1993 | Ueta et al. | |
| 5,329,215 A | 7/1994 | Fraser et al. | |
| 5,734,173 A | 3/1998 | Braun | |
| 6,163,970 A | 12/2000 | Nelle et al. | |

FOREIGN PATENT DOCUMENTS

| | | |
|---|---|---|
| DE | 1 638 032 | 12/1971 |
| DE | 27 27 769 | 1/1979 |
| DE | 38 18 044 A1 | 11/1989 |
| DE | 41 07 707 A1 | 9/1991 |
| DE | 44 91 093 T1 | 1/1996 |

(Continued)

*Primary Examiner*—John H Le
(74) *Attorney, Agent, or Firm*—Harness, Dickey & Pierce, P.L.C.

(57) ABSTRACT

In a coordinate measuring machine or any other kind of machine having at least one translational movement axis, correction values are determined by moving the mobile head of the machine along a defined path of movement. First and second position data are recorded by means of first and second position measuring devices. The first position data originate from position measuring devices of the machine. The second position data result from a reference measurement. The correction values are determined as a function of the first and second position data. A defined number of correction values is determined for each section of the path of movement, with the defined number varying in the sections as a function of the error profile defined by the correction values.

17 Claims, 3 Drawing Sheets

FOREIGN PATENT DOCUMENTS

| | | |
|---|---|---|
| DE | 196 21 015 C2 | 11/1997 |
| DE | 197 24 732 A1 | 12/1998 |
| DE | 101 62 849 A1 | 7/2003 |
| DE | 102 33 155 A1 | 2/2004 |
| EP | 0 048 851 B1 | 4/1982 |
| EP | 0 182 394 | 5/1986 |

* cited by examiner

METHOD FOR DETERMINING CORRECTION VALUES FOR CORRECTING POSITIONAL MEASUREMENT ERRORS IN A MACHINE HAVING AT LEAST ONE TRANSLATIONAL AXIS OF MOVEMENT

CROSS REFERENCES TO RELATED APPLICATIONS

This application is a continuation of international patent application PCT/EP2006/004641, filed on May 17, 2006 designating the U.S., which international patent application has been published in German language as WO 2006/133782 A1 and claims priority from German patent application 10 2005 028 788.3, filed on Jun. 16, 2005. The entire contents of these priority applications are incorporated herein by reference.

BACKGROUND OF THE INVENTION

The present invention relates to a method for determining correction values for correcting positional measurement errors in a machine having at least one translational movement axis, such as, in particular in a coordinate measuring machine. The invention further relates to a coordinate measuring machine having a memory for storing correction values which have been determined in accordance with such a method.

Coordinate measuring machines are typically used to measure the shape of a measurement object with high accuracy. For example, coordinate measuring machines are used to check the shape of workpieces for quality control. A coordinate measuring machine has a displacement mechanism which enables a probe to move inside a measurement volume. The probe is brought into a defined position relative to the measurement object, and subsequently the spatial coordinates of the measuring points are determined from the position of the probe in the measurement value.

The probe often carries a stylus designed for contacting the selected measuring point on the measurement object in order to initiate the determination of the spatial coordinates. As an alternative, however, there are also heads which sense the measurement object without making contact, for example by means of optical means. The present invention is independent of the type of probing. It relates to all coordinate measuring machines and, moreover, to any other machines, where a head is moved via a displacement mechanism along at least one translational axis of movement. Thus, the invention can, for example, also be applied in the case of machine tools, EDM machines or robots. The head is then, for example, a tool holding fixture.

For sake of simplicity, however, the invention is illustrated below for the preferred application of a coordinate measuring machine, since here the requirements placed on the measuring accuracy for the sensing of position are particularly high.

The current spatial position of the head is determined by means of what is called material measures (or material representations) in the case of known coordinate measuring machines. Said material measures are often glass bars on which a scale is applied. Position data for the position of the head are read off at the material measures by means of a suitable sensor system.

However, it is known that the accuracy in the determination of the spatial position of the head is limited. In other words, each measurement is affected by measurement errors. The measurement errors have various causes. These include the limited accuracy with which material measures can be produced. This holds true, in particular, in the case of large coordinate measuring machines in which the material measures must be assembled from a number of parts. However, even in the case of relatively small coordinate measuring machines small manufacturing tolerances in the material measures are already enough to affect the measuring accuracy of the machine. It can happen that only a few of a plurality of "equal" material measures are suitable for the desired accuracy of a coordinate measuring machine. Sometimes, defects in the material measures come to light only after they have been installed in the coordinate measuring machine, and this is particularly disadvantageous since the "poor" material measures must subsequently be exchanged. The production costs of a coordinate measuring machine therefore depend strongly on the quality and the costs of the material measures.

It is known to compile correction value tables (or error tables) and make them available in a memory of the coordinate measuring machine in order to reduce the inevitably remaining measurement errors. For this purpose, the head of the coordinate measuring machine is moved along defined path of movements. The positions of the head are recorded both with the position measuring devices of the coordinate measuring machine itself, and with second position measuring devices. It is usually laser interferometers and what is called inclination scales which serve as second position measuring devices in this sense. The position data of these second position measuring devices are adopted as "true" position data, and correction values are determined from the comparison with the first position data of the coordinate measuring machine. These correction values are taken into account in the measurements. Such a method is described, for example, in DE 1 638 032 A1.

The accuracy of this error correction depends, inter alia, on how "finely meshed" the network of the correction values is. The greater the spacings at which correction values are determined, the more likely it is for position-specific errors (so-called short-period errors) not to be detected and, consequently, not to be corrected. Consequently, a "finely meshed" network of correction values is desirable for a high accuracy.

However, the determination of many correction values is time consuming, particularly for large coordinate measuring machines, such as are used, for example, in order to measure entire motor vehicle bodies. Moreover, large correction value tables require a great deal of memory space in the control and evaluation unit of the coordinate measuring machine. Both factors contribute to high production costs.

On the other hand, it is just large coordinate measuring machines having assembled material measures which are particularly susceptible to position-specific errors, in particular at the joints of the multipartite scales. There is a range of proposals for avoiding or at least reducing such errors.

An overview of the prior art is given by DE 197 24 732 A1, which describes a modular scale in which the joints of the assembled scale are positioned such that they lie as distant as possible from the joints of an associated carrier element. Thus, an attempt is made here to improve the quality of assembled scales.

DE 101 62 849 A1 proposes that a scale which is shorter than the measuring volume is moved relative to the position of a number of sensors spaced apart from one another, one of the sensors respectively being selected for the measuring. The disadvantage of this proposal is a need for a plurality of sensors, which is expensive. DE 196 21 015 C2 also proposes to increase the accuracy in the region of joints of an assembled scale by making use of a number of sensors. Moreover, it is known to identify the joints of scales by specific code fields (DE 38 18 044 A1), or to provide setting screws by means of which the spacing of the scale parts in the region of a joint can be adjusted (DE 27 27 769 C2). The additional outlay increases the production costs of the coordinate measuring machine in all cases.

SUMMARY OF THE INVENTION

Against this background, it is an object of the present invention to provide for a method which enables a reduction in the production costs of a coordinate measuring machine without disadvantageously affecting the measuring accuracy. It is also an object to provide for a corresponding coordinate measuring machine.

In accordance with one aspect of the invention, there is provided a method for determining correction values for correcting positional measurement errors in a machine having at least one translational axis of movement, the machine having a mobile head and first position measuring devices in order to determine a spatial position of the head, the method comprising the steps of: moving the head along a defined path of movement having a plurality of sections, the head assuming a plurality of positions along the path of movement, recording a plurality of first position data at the positions of the head by means of the first position measuring devices, recording a plurality of second position data at the positions of the head by means of a second position measuring device, and determining a plurality of correction values as a function of the first and second position data, with the correction values representing an error profile along the path of movement, wherein a defined number of correction values is determined for each section of the path of movement, and wherein the defined number in the sections is varied as a function of the error profile.

According to another aspect, in a machine having a mobile head moveable along at least one translational axis of movement, and having first position measuring devices for determining a spatial position of the head along the axis of movement, the first position measuring devices defining a measuring range, a method for determining correction values for correcting positional measurement errors of the position measuring devices is provided, the method comprising the steps of: moving the head along a defined path of movement so that the head reaches a plurality of positions, recording a plurality of first position data at the positions by means of the first position measuring devices, recording a plurality of second position data at the positions by means of a second position measuring device, and determining a plurality of correction values as a function of the first and second position data, with the correction values representing an error profile as a function of the positions, wherein the first and second position data are recorded for the entire measuring range, wherein position-specific errors are determined by means of the error profile, wherein the head is moved into a region of a position-specific error, and wherein supplementary first and second position data are recorded in the region of the position-specific error in order to increase a correction value density in the region of the position-specific error by determining supplementary correction values from the supplementary first and second position data.

According to yet another aspect, there is provided a computer readable medium comprising a computer program having a program code that is designed to execute such methods, and a machine comprising correction values determined in accordance with the new methods.

The new methods and machines therefore adopt the approach (known per se) of providing correction values for the purpose of correcting positional measurement errors by calculation. Consequently, the measuring accuracy of the novel coordinate measuring machine is not directly dependent on the quality of the material measures. The present invention therefore enables the use of poorer quality scales, as a result of which it is possible to lower the production costs. There is also no longer any need for a later exchange of a "poor" scale.

On the other hand, the new method and machine turn away from the approach practiced so far, namely always determining correction values at uniform spacings. Rather, the method embarks on the path of adapting the number of correction values (more accurately: the correction value density) to the actual error profile. If the error profile is relatively uniform, the spacing of the correction values (more accurately: the spacing between two positions at which correction values are determined) can be relatively large. If, by contrast, the error profile has sharp fluctuations, it is advantageous to select the spacing of the correction values to be correspondingly small. In particular, with the novel method many tightly juxtaposed correction values are determined wherever position-specific errors occur, for example at junctions of multipartite scales. By contrast, apart from position-specific errors the spacing of the correction values can be selected to be larger, that is to say only a small number of correction values will be required in the corresponding section of the path of movement.

Thus, the new methods use a finely meshed network of correction values only where this actually contributes to increasing the measuring accuracy. In regions where a finely meshed network of correction values does not appreciably improve the measuring accuracy, the number of correction values is, by contrast, reduced. As a consequence thereof, the new methods enable the size of the correction value tables to be reduced without deteriorating the measuring accuracy of the new coordinate measuring machine. Moreover, the time which is required to record and determine the correction values can be greatly reduced, and it is nevertheless possible to use material measures having relatively large manufacturing tolerances.

The present invention thus, on the one hand, enables the use of inexpensive material measures. On the other hand, the time required for compiling a suitable correction value table is substantially reduced. Both factors contribute to lowering the production costs of a coordinate measuring machine without its measuring accuracy being diminished. The above object is therefore completely achieved.

In a preferred refinement of the invention, position-specific errors are determined by means of the error profile, and, in a section with a position-specific error, more correction values are determined as in a section without position-specific errors.

In this refinement, the error profile is specifically analyzed in terms of position-specific errors, and the number of the correction values is increased in the region of such an error. The refinement has the advantage that position-specific errors are taken into account not only at known joints of a multipartite scale, but generally. Thus, it is also possible for manufacturing tolerances between the ends of a scale to be detected and corrected. The accuracy of the novel coordinate measuring machine is therefore uniformly high over the entire measuring range.

In a further refinement, the first and second position data are recorded with smaller relative spacings in the region of a position-specific error than away from a position-specific error.

This refinement goes on from the preceding refinement in that the first and second position data are recorded in the region of a position-specific error with a higher data density (node density). It follows that there are more finely resolved position data available for determining the correction values with a correspondingly finer resolution. However, it would also be possible as an alternative thereto to obtain the increased number of correction values in the region of a position-specific error by intelligent interpolation methods, for example by means of a spline interpolation.

In a further refinement, supplementary first and second position data are recorded in the region of a position-specific error, in order to determine supplementary correction values.

In this refinement, the higher interpolation point density in the region of a position-specific error is implemented by virtue of the fact that further position data are specifically recorded in the region of the error. This refinement firstly enables position data to be recorded relatively quickly for the entire measuring range. Only wherever it is sensible are supplementary data then recorded, for example in a second pass in which the head is once again specifically moved into the region of a detected position-specific error. This refinement is particularly efficient and delivers a high, uniform accuracy.

In the latter case, it is particularly preferable when the head is firstly moved to equidistant spatial positions, and first and second position data are respectively recorded there. The error curve then obtained is subsequently examined for position-specific errors. Wherever such errors are detected, the head is moved off for a second time, and the supplementary first and second position data are recorded with smaller relative spacings. A particularly quick, and yet accurate determination of correction values is thereby enabled.

In a further refinement, a position-specific error is respectively adopted wherever the error profile exhibits a profile change which is substantially stronger than an average profile change.

This refinement includes a particularly simple way of identifying position-specific errors independently of the cause of error. In particular, it is thereby possible to identify position-specific errors which occur at unknown points, for example away from joints.

In a further refinement, the neighboring correction values are compared in order to identify position-specific errors.

This refinement is based on an comparison of the correction values in order to identify the position-specific errors, which is relatively easy to implement.

In a particularly preferred refinement, the firstly obtained correction values are smoothed in a first processing step, something which can be performed using an FIR filter, for example. The gradient of the smoothed error profile is subsequently examined, and this corresponds mathematically to the evaluation of the derivative of the error profile. Local deviations in the error profile can be localized very accurately in this way.

In another preferred refinement, a check is made as to whether the individual correction values lie inside a sliding window, the width and height of the window being adapted to the profile of the correction values such that local outliers are quickly seen.

In a further, likewise preferred refinement, the error profile is subjected to a frequency analysis, a position-specific error being adopted when the error profile exhibits a spatial frequency which is higher than a defined reference frequency. It is particularly preferred for the frequency analysis to be performed in sections, since the occurrence of a high spatial frequency in one section of the path of movement indicates that a position-specific error is present in this section.

A frequency analysis is a very quick and effective possibility for establishing whether the error profile exhibits position-specific deviations. A particular advantage is that it can thereby be established very quickly whether any position-specific errors occur at all in the error profile.

It is particularly preferred when the frequency analysis is performed by means of a Fourier analysis of the error profile, and/or by means of filter elements at whose output a threshold decision element is arranged.

The error profile can be examined very quickly and in an automated fashion for the presence of high spatial frequencies by means of these two possibilities, and so position-specific errors can correspondingly be detected quickly.

In a further refinement of the invention, the head is moved continuously along the path of movement, the first and second position data being recorded simultaneously.

The first and second position data are recorded with a high interpolation point density and, nevertheless, relatively quickly by means of this refinement. This refinement is therefore particularly suitable for determining a finely meshed network of correction values.

In an alternative refinement, the head is moved along the path of movement, the first and second position data respectively being recorded when the head stops.

In contrast to the previously mentioned alternative, this refinement requires more time in traversing the path of movement. On the other hand, it is simpler here to synchronize the recording of the first and second position data. This refinement is therefore particularly preferred whenever an accurate synchronization of the first and second position measuring devices means a high outlay.

In a further refinement of the invention, the correction values are stored in a correction value file, the number of the stored correction values varying as a function of the error profile.

This refinement is particularly preferred when the head is moved continuously along the path of movement, but it can also be used in the case of stepwise movement. This refinement reduces the size of the correction value file, in particular when it turns out after the recording of the first and second position data that the interpolation point density thereby produced is not required. This refinement is suitable, especially, for relatively old or inexpensive coordinate measuring machines having limited memory space.

It goes without saying that the above-mentioned features, and those still to be explained below, can be used not only in the respectively specified combination, but also in other combinations or on their own, without departing from the scope of the present invention.

BRIEF DESCRIPTION OF THE DRAWINGS

Exemplary embodiments of the invention are illustrated in the drawing and explained in more detail in the following description. In the drawing.

DESCRIPTION OF PREFERRED EMBODIMENTS

Figure 1:
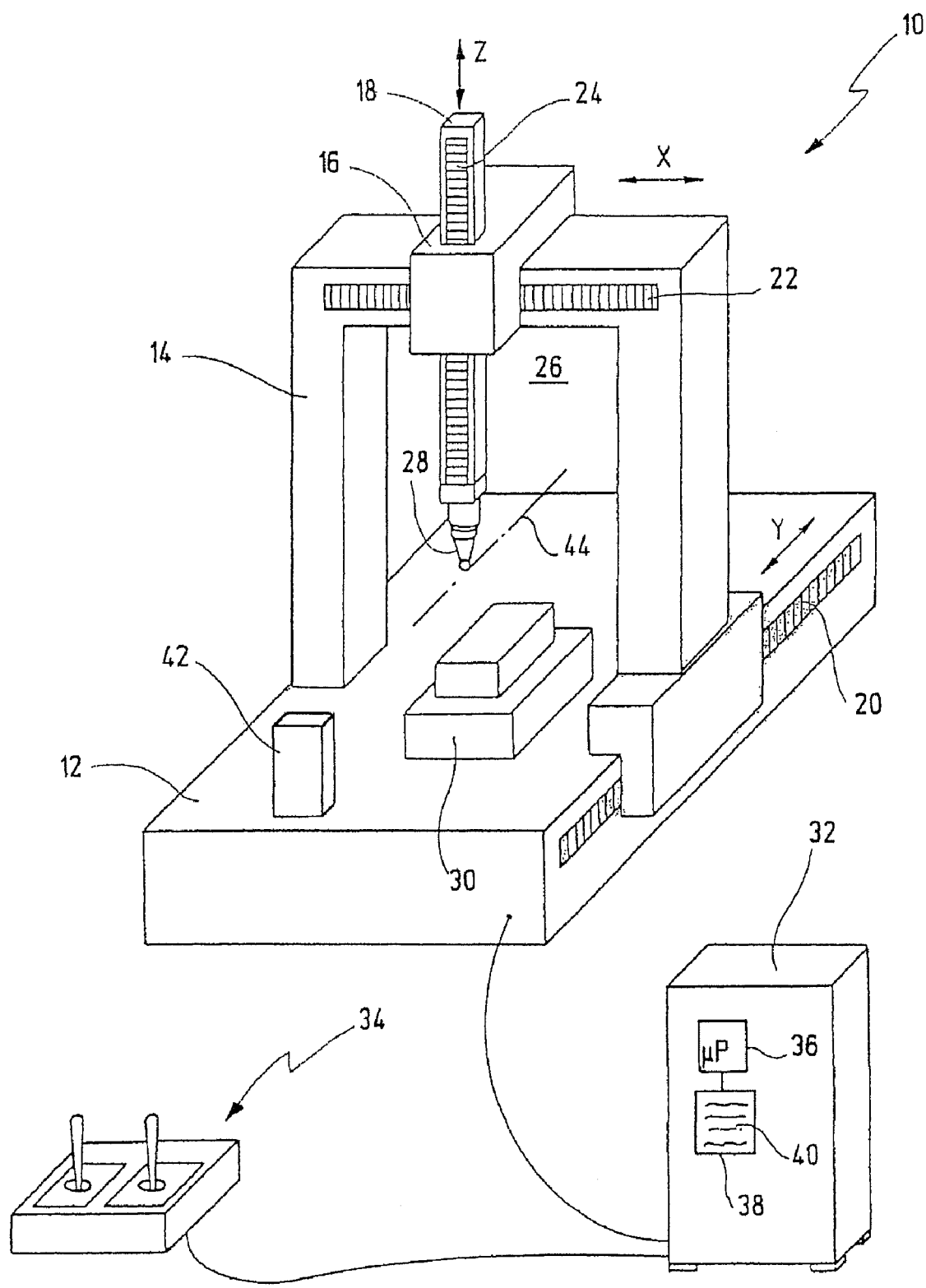
FIG. 1 shows an exemplary embodiment of a coordinate measuring machine having the novel measured value correction.

In FIG. 1, reference numeral 10 designates an exemplary embodiment of a coordinate measuring machine in its entirety. The coordinate measuring machine 10 is illustrated in a portal structure here. However, the invention is not restricted to this, and can likewise be used in the case of coordinate measuring machines of different structure, for example coordinate measuring machines having a horizontal cantilever arm. Moreover, as already mentioned at the beginning, the invention can also be used with all other machines in which a head is moved along at least one translational path of movement, and in which the positions of the head must be determined.

The coordinate measuring machine 10 has a base 12 upon which a portal 14 is moveably arranged. The direction of movement of the portal 14 is designated as the Y-axis. A carriage 16 which can be moved in the X-direction is arranged on the crossbeam of the portal 14. Seated on the carriage 16 is a quill 18 which can be moved in the Z-direction. The reference numerals 20, 22, 24 designate material measures, here in the form of glass scales. Reference numeral 26 designates the measurement volume in which the probe 28 of the coordinate measuring machine 10 can be moved.

Illustrated symbolically inside the measurement volume 26 is a measurement object 30 which is to be measured by means of the coordinate measuring machine 10.

Reference numeral 32 designates an evaluation and control unit which controls the travel movements of the probe 28 along the three coordinate axes X, Y and Z, and also determines the spatial coordinates of a touched measuring point. The travel movements of the probe 28 can optionally be controlled manually, this purpose being served by a control panel 34, or else can be carried out automatically by means of the control unit 32.

The control unit 32 includes a processor 36 and at least one memory 38 in which an operating and evaluation program and correction values 40 are stored. The evaluation and control unit 32 uses the correction values 40 to correct measurement errors which result from inaccuracies in the scales 20, 22, 24 and from other causes of error.

Reference numeral 42 illustrates in a simplified fashion a laser interferometer which is required only when calibrating the coordinate measuring machine 10. The position of the probe 28 in the measurement volume 26 can be determined precisely by means of the laser interferometer 42. The position data obtained (second position data in the sense of the present invention) are compared with the (first) position data which the evaluation and control unit 32 receives from the scales 20, 22, 24 of the machine. The respective difference is used to calculate correction values which are stored in the memory 38. The first and second position data are recorded when the head 28 is moved along defined paths of movement. A path of movement is shown here, for example, at reference numeral 44.

Figure 2:
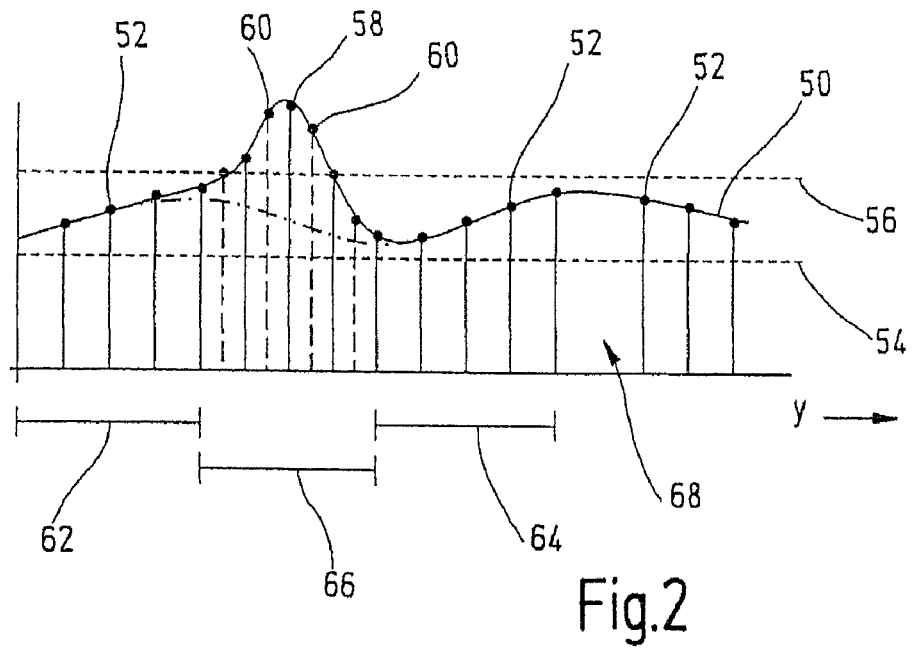
FIG. 2 shows a simplified illustration of an error profile in the case of the coordinate measuring machine from FIG. 1.

FIG. 2 shows in a simplified fashion an error profile 50 which results when the individual correction values 52 are interconnected by means of an interpolating spline. The error profile 50 is illustrated here along the Y-axis, this corresponding to a travel movement of the head 28 along the path of movement 44. However, it is self-evident that the present invention is not restricted to a one-dimensional error profile, but can also be applied in the case of correction values which are recorded along orthogonal movement axes.

Two dashed lines 54, 56 indicate a correction value interval in which the majority of the correction values 52 lie. The correction value 58 and a few neighboring correction values lie outside this error interval, however. In other words, in the case of reference numeral 58 the error profile 50 has a local outlier which indicates a position-specific error, such as a contact point of the corresponding scale 20, 22, 24.

According to the present invention, correction values are therefore stored in the memory 38 of the evaluation and control unit 32 with a relatively high correction value density (smaller spatial spacings from one another), something which is illustrated in FIG. 2 by means of supplementary correction values 60. The closer spacings of the correction values 58, 60 here yield a finer resolution, and this finely leads to a higher accuracy in the region around the position-specific error.

In other words, the number of the correction values 52, 60 in each section of the path of movement 44 is a function of the error profile 50. In the sections 62 and 64, the correction value density is here only half as large as in the section 66. Moreover, the number of the correction values can also still vary further, and this is illustrated by way of example in there being no correction value in the case of the reference numeral 68. This correction value is not required because of the relatively linear profile and because of the slight differences in the neighboring correction values. If appropriate, an equivalent result is arrived at by interpolation.

Figure 3:
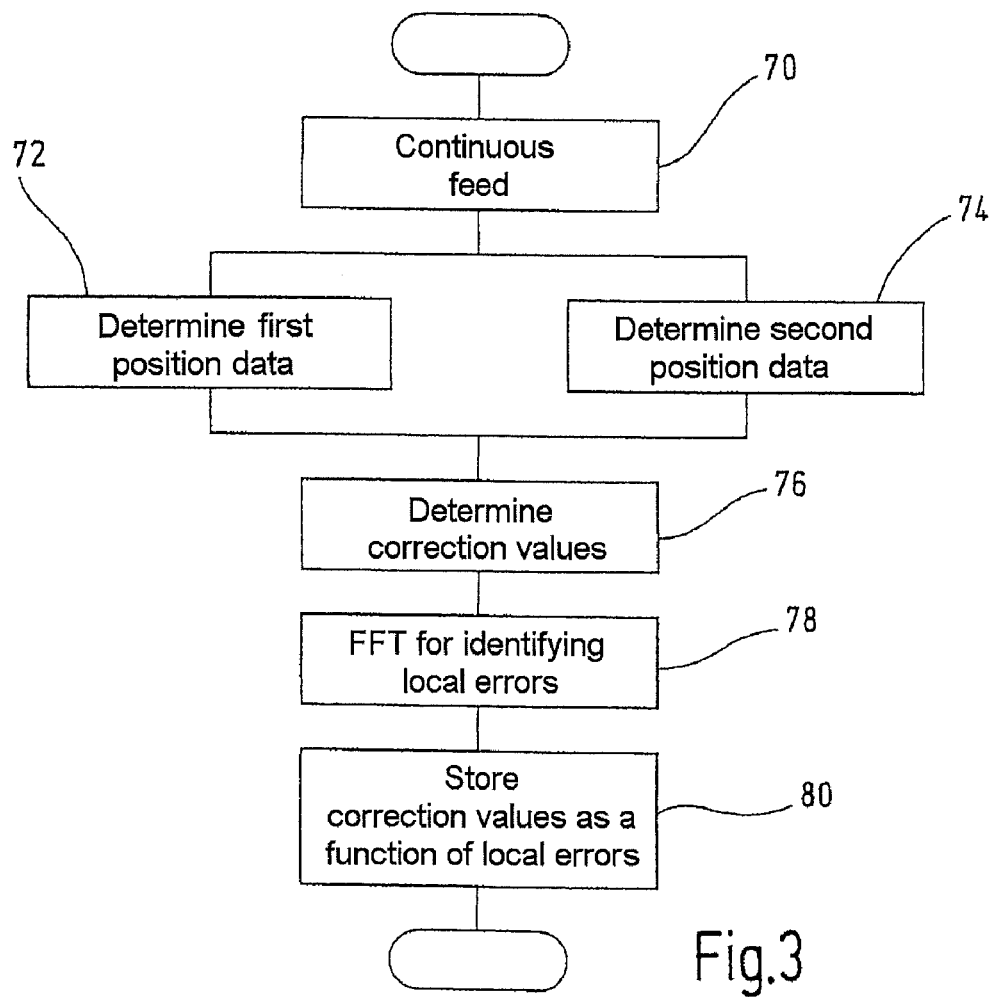
FIG. 3 shows a diagrammatic flowchart for explaining a first exemplary embodiment of the new method.

FIG. 3 shows a first exemplary embodiment for explaining the novel method. The head 28 is moved in this case continuously along the path of movement 44 (step 70). At the same time, the first and second position data are recorded (reference numerals 72, 74). Subsequently, the correction values are determined from the difference in the position data (reference numeral 76). The plurality of the correction values result in an error profile such as is illustrated in a simplified fashion in FIG. 2 by reference numeral 50.

This error profile can now be analyzed in order to identify position-specific errors. In the case of the exemplary embodiment illustrated in FIG. 3, this step is performed by means of a Fourier analysis, for example an FFT (Fast Fourier Transformation) which is carried out in sections over the sections 62, 64, 66. (An FFT in this case requires $2^N$ equidistant measured values.)

If the outcome of the analysis is that relatively high spatial frequencies are present in the section examined, this indicates a strong local fluctuation in the error profile. In accordance with step 80, in this case the correction values are stored in the memory 38 in such a way that a higher number of correction values are stored in the region of the identified position-specific errors than are apart therefrom. The size of the correction value file is therefore a function of the error profile 50.

Figure 4:
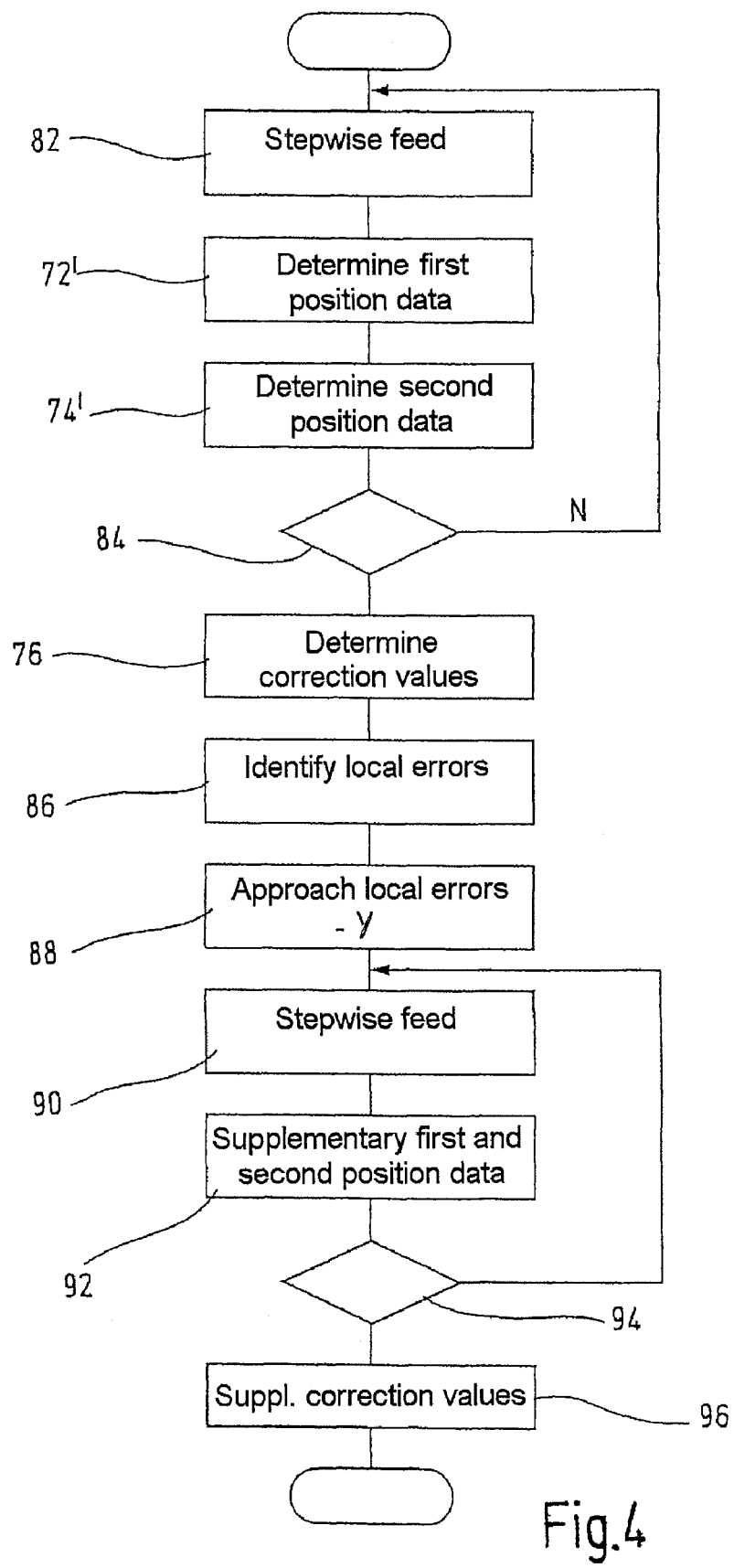
FIG. 4 shows a diagrammatic flowchart for explaining a second exemplary embodiment of the new method.

FIG. 4 shows a further exemplary embodiment of the novel method, the head 28 being moved here in steps along the path of movement 44. Reference numeral 82 illustrates a first feed step. After the head 28 has come into its new position of rest, the first position data (reference numeral 72) and the second position data are read in. There is no need for the recordings of the first and second position data to be synchronized exactly in this mode of procedure.

At reference numeral 84, a decision is taken as to whether the head 28 has reached its envisaged end position. If this is not the case, in accordance with step 82 the head 28 is moved again by a defined distance. Subsequently, the first and second position data are recorded anew.

Once all the first and second position data have been read in, it is possible to determine the correction values in accordance with step 76. Subsequently, the position-specific errors are sought (reference number 86). For example, the search for the position-specific errors is performed in this case by smoothing the correction values from step 76 by means of an FIR filter, in order to suppress statistical fluctuations (noise). Subsequent thereto, the smoothed curved profile is examined for steep gradients and/or strong curvatures.

In an alternative exemplary embodiment, a window having a length of, for example, 10 correction values and a height as illustrated in FIG. 2 by means of the lines 54, 56 is spread smoothly over the plurality of the correction values. The height of the window can also be adapted smoothly to the profile of the correction values. If individual correction values emerge from the window, such as the correction value 58 in FIG. 2, for example, this indicates a position-specific error.

In a further alternative, the error profile 50 can be filtered by means of a filter, in particular a digital filter. The filter is set such that high frequencies and/or specific frequencies indicating a specific error are passed, while "normal" variations in the error profile 50 are suppressed. Arranged at the output of the filter is a threshold decision element (not illustrated here) that outputs a signal when the error profile 50 includes the appropriate frequencies.

The result of this frequency analysis is comparable to the Fourier analysis which has been mentioned in the case of the exemplary embodiment in FIG. 3.

When a position-specific error has been detected, the head 28 is moved to a position which lies at a few position values Y in front of the detected error (reference numeral 88). Starting from here, the head 28 is again fed in stepwise fashion (reference numeral 90). After each stoppage of the head 28, supplementary first and second position data are read in (reference numeral 92). Interrogation is performed at reference numeral 94 as to whether all supplementary position data have been recorded. If this is not the case, the head 28 is fed again. Otherwise, the determination of the supplementary correction values (reference numeral 96) is performed by means of the supplementary first and second position data.

What is claimed is:

1. A method for determining correction values for correcting positional measurement errors in a machine having at least one translational axis of movement, the machine having a mobile head and first position measuring devices in order to determine a spatial position of the head, the method comprising the steps of:
    moving the head along a defined path of movement having a plurality of sections, the head assuming a plurality of positions along the path of movement,
    recording a plurality of first position data at the positions of the head by means of the first position measuring devices,
    recording a plurality of second position data at the positions of the head by means of a second position measuring device, and
    determining a plurality of correction values as a function of the first and second position data, with the correction values representing an error profile along the path of movement,
    wherein a defined number of correction values is determined for each section of the path of movement, and
    wherein the number of correction values determined per unit distance of travel along said defined path of movement varies for each of said sections as a function of the error profile.

2. The method of claim 1, wherein position-specific errors are determined by means of the error profile, and wherein the number of correction values determined per unit distance of travel is increased for any section with a position-specific error.

3. The method of claim 2, wherein the plurality of positions have relative spacings between neighboring positions, with the relative spacings being reduced for any section having a position-specific error.

4. The method of claim 2, wherein supplementary first and second position data are recorded in a vicinity of a position-specific error in order to determine supplementary correction values.

5. The method of claim 2, wherein the error profile has an average profile change, with a position-specific error being assumed wherever the error profile exhibits a profile change that is substantially greater than the average profile change.

6. The method of claim 1, wherein the head is continuously moved along the path of movement, with the first and second position data being recorded simultaneously.

7. The method of claim 1, wherein the head is moved along the path of movement in steps, with the first and second position data each being recorded when the head has stopped.

8. The method of claim 1, wherein the correction values are stored in a correction value file, with the number of the stored correction values per unit distance of travel along said defined path of movement varying as a function of the error profile.

9. In a machine having a mobile head moveable along at least one translational axis of movement, and having first position measuring devices for determining a spatial position of the head along the axis of movement, the first position measuring devices defining a measuring range, a method for determining correction values for correcting positional measurement errors of the position measuring devices, the method comprising the steps of:
    moving the head along a defined path of movement so that the head reaches a plurality of positions,
    recording a plurality of first position data at the positions by means of the first position measuring devices,
    recording a plurality of second position data at the positions by means of a second position measuring device, and
    determining a plurality of correction values as a function of the first and second position data, with the correction values representing an error profile as a function of the positions,
    wherein the first and second position data are recorded for the entire measuring range,
    wherein position-specific errors are determined by means of the error profile,
    wherein the head is moved into a region of a position-specific error, and
    wherein supplementary first and second position data are recorded in the region of the position-specific error in order to increase a correction value density in the region of the position-specific error by determining supplementary correction values from the supplementary first and second position data.

10. The method of claim 9, wherein the head is first moved to equidistant spatial positions for recording the first and second position data, and wherein the error profile is subsequently examined in order to determine the position-specific errors.

11. The method of claim 10, wherein a position-specific error is assumed wherever the error profile exhibits a profile behavior that differs from an average profile behavior.

12. The method of claim 10, wherein the error profile is subjected to a frequency analysis, with a position-specific error being assumed when the error profile comprises a spatial frequency that is higher than a defined reference frequency.

13. A computer readable medium comprising a computer program having a program code that is designed to execute a method, when the program code is run on a control computer of a machine having a head moveable along at least one translational axis of movement and having first position measuring devices for determining a spatial position of the head, the method comprising the steps of:

moving the head along a defined path of movement having a plurality of sections, the head assuming a plurality of positions along the path of movement, recording a plurality of first position data at the positions of the head by means of the first position measuring devices, recording a plurality of second position data at the positions of the head by means of a second position measuring device, and determining a plurality of correction values by means of the first and second position data, with the correction values representing an error profile along the path of movement, wherein a defined number of correction values is determined for each section of the path of movement, and wherein the number of correction values determined per unit distance of travel along said defined path of movement varies as a function of the error profile.

14. A machine comprising a head adapted to move along at least one translational axis of movement and first position measuring devices for determining a spatial position of the head, the first position measuring devices supplying first position data of the head; the machine further comprising a control unit for correcting the first position data, the control unit having a memory for storing correction values which represent an error profile dependent on the positions of the head along a path of movement, wherein the control unit stores a defined number of correction values for each section of the path of movement, and further wherein the number of stored correction values per unit movement of travel along said oath of movement varies for each of said sections as a function of the error profile.

15. A method for determining correction values for correcting positional measurement errors in a machine having at least one translational axis of movement, the machine having a mobile head and first position measuring devices in order to determine a spatial position of the head, the method comprising the steps of:

moving the head along a defined path of movement having a plurality of sections, the head assuming a plurality of positions along the path of movement, recording a plurality of first position data at the positions of the head by means of the first position measuring devices, recording a plurality of second position data at the positions of the head by means of a second position measuring device, and determining a plurality of correction values as a function of the first and second position data, with the correction values representing an error profile along the path of movement, wherein a defined number of correction values is determined for each section of the path of movement, wherein the defined number in each of the sections is varied as a function of the error profile, and further wherein neighboring correction values are compared in order to identify position-specific errors, and wherein the number of correction values determined per unit distance of travel is increased for any section with a position-specific error.

16. A method for determining correction values for correcting positional measurement errors in a machine having at least one translational axis of movement, the machine having a mobile head and first position measuring devices in order to determine a spatial position of the head, the method comprising the steps of:

moving the head along a defined path of movement having a plurality of sections, the head assuming a plurality of positions along the path of movement, recording a plurality of first position data at the positions of the head by means of the first position measuring devices, recording a plurality of second position data at the positions of the head by means of a second position measuring device, and determining a plurality of correction values as a function of the first and second position data, with the correction values representing an error profile along the path of movement, wherein a defined number of correction values is determined for each section of the path of movement, wherein the defined number in each of the sections is varied as a function of the error profile, and further wherein the error profile is subjected to a frequency analysis, with a position-specific error being assumed when the error profile exhibits a spatial frequency that is higher than a defined reference frequency, and wherein the number of correction values determined per unit distance of travel is increased for any section with a position-specific error.

17. The method of claim 16, wherein the frequency analysis is performed by means of at least one of a Fourier analysis of the error profile and filter elements coupled to a threshold decision element.

* * * * *

UNITED STATES PATENT AND TRADEMARK OFFICE
CERTIFICATE OF CORRECTION

PATENT NO. : 7,734,438 B2
APPLICATION NO. : 11/956492
DATED : June 8, 2010
INVENTOR(S) : Ulrich Staaden et al.

It is certified that error appears in the above-identified patent and that said Letters Patent is hereby corrected as shown below:

Column 11,
Line 32, "oath" should be --path--.

Signed and Sealed this

Twenty-fourth Day of August, 2010

David J. Kappos
*Director of the United States Patent and Trademark Office*